United States Patent [19]

Fry et al.

[11] Patent Number: 5,727,154
[45] Date of Patent: Mar. 10, 1998

[54] PROGRAM SYNCHRONIZATION ON FIRST AND SECOND COMPUTERS BY DETERMINING WHETHER INFORMATION TRANSMITTED BY FIRST COMPUTER IS AN ACCEPTABLE OR UNACCEPTABLE INPUT TO SECOND COMPUTER PROGRAM

[76] Inventors: Shawn C. Fry, 1902 Audobon Ct., Richmond, Tex. 77469; Gregory L. Mahan, 2501 Lazy Hollow, Apt. 228-B, Houston, Tex. 77063; Christopher D. Christopher, 7030 Delbello Rd., Manvel, Tex. 77578

[21] Appl. No.: 430,457

[22] Filed: Apr. 28, 1995

[51] Int. Cl.$^6$ .................................................. H01J 13/00
[52] U.S. Cl. ........................................................ 395/200.19
[58] Field of Search ........................ 395/200.01, 200.02, 395/200.05, 200.12, 200.14, 200.03, 200.09, 200.19; 371/30, 32, 33; 370/60, 60.1, 94.1; 379/93, 96

[56] References Cited

U.S. PATENT DOCUMENTS

| | | | |
|---|---|---|---|
| 3,653,001 | 3/1972 | Ninke | 395/132 |
| 4,425,625 | 1/1984 | Seligman et al. | 379/98 |
| 4,581,484 | 4/1986 | Bendig | 379/67 |
| 4,691,340 | 9/1987 | Maeda et al. | 379/96 |
| 4,712,214 | 12/1987 | Meltzer et al. | 371/32 |
| 4,894,857 | 1/1990 | Szlam et al. | 379/67 |
| 4,935,870 | 6/1990 | Burk, Jr. et al. | 395/200.09 |
| 4,970,714 | 11/1990 | Chen et al. | 370/216 |
| 4,972,183 | 11/1990 | Kuhlmann et al. | 340/825.22 |
| 5,010,553 | 4/1991 | Scheller et al. | 371/35 |
| 5,036,484 | 7/1991 | McCoy et al. | 395/500 |
| 5,058,000 | 10/1991 | Cox et al. | 395/610 |
| 5,109,487 | 4/1992 | Ohgomori et al. | 395/200.14 |
| 5,146,568 | 9/1992 | Flaherty et al. | 395/500 |
| 5,155,847 | 10/1992 | Kirouac et al. | 395/200.09 |
| 5,168,269 | 12/1992 | Harlan | 345/145 |
| 5,228,137 | 7/1993 | Kleinerman et al. | 395/500 |
| 5,241,565 | 8/1993 | Kloc et al. | 375/285 |

(List continued on next page.)

OTHER PUBLICATIONS

"A Phone Directory and XMODEM for SMALLCOM", by Stevens, Al, Apr., 1989, Dr. Dobb's Journal of Software Tools, V14, n4, P109 (4).

"A Micro–Mainframe Primer", by Daney, C., Jan. 22, 1985, PC Magazine, V4, n2, P114–130.

"The Language of Communications Software",by Olympia, P.L., Sep. 11, 1987, Goverment Computer News, V6, n18, P113(6).

"Fast, Trouble–Free Communication", by Stone, David, May 1991, PC Sources, V2, n5, P393(9).

"Improving Information Access", by Byrd, Mike, Apr. 30, 1991, PC Magazine, V10, n8, P101 (37).

"Binary Transfer", by Florence, Ronald, Mar. 1987, PC Tech Journal, V5, n3, P144 (8).

"You Make the Call", by Kanamoto, Wayne, Dec. 1993, Computer Shopper, V13, n12, P575 (9).

"Shopping for Software", Daster Communications Dec. 1987, p. 155, vol. 16, No. 13.

"Understanding Data Communications and Networks", by William Shay, 1994, pp. 123–124, 178–179.

"Computer Dictionary", by Microsoft Press, 1993, pp. 30–31, 337.

*Primary Examiner*—Moustafa M. Meky
*Attorney, Agent, or Firm*—Mark L. Berrier

[57] ABSTRACT

A computer system and method for executing the synchronization of a program executing on a first computer with a program executing on a second computer, each program transmitting information to the other program and remaining at its current program step until receiving an acknowledgment that the transmitted information was one of a set of acceptable inputs to the other program. If one of the programs receives an acceptable input or an acknowledgment of same, it advances to its next program step. If one of the programs receives an unacceptable input or non-acknowledgment of receipt of an acceptable input, it remains at its current program step.

14 Claims, 3 Drawing Sheets

U.S. PATENT DOCUMENTS

| | | | |
|---|---|---|---|
| 5,253,341 | 10/1993 | Rozmanith et al. | 395/200.09 |
| 5,257,369 | 10/1993 | Skeen et al. | 395/680 |
| 5,293,571 | 3/1994 | Matsuda et al. | 370/445 |
| 5,299,197 | 3/1994 | Schlafly | 370/393 |
| 5,339,430 | 8/1994 | Lundin et al. | 395/685 |
| 5,347,632 | 9/1994 | Filepp et al. | 395/200.09 |
| 5,361,091 | 11/1994 | Hoarty et al. | 348/7 |
| 5,388,211 | 2/1995 | Hornbuckle | 395/712 |
| 5,392,400 | 2/1995 | Berkowitz et al. | 395/200.01 |
| 5,453,986 | 9/1995 | Davis et al. | 370/259 |
| 5,483,556 | 1/1996 | Pillan et al. | 375/340 |
| 5,490,251 | 2/1996 | Clark et al. | 395/200.2 |
| 5,491,820 | 2/1996 | Belove et al. | 395/603 |

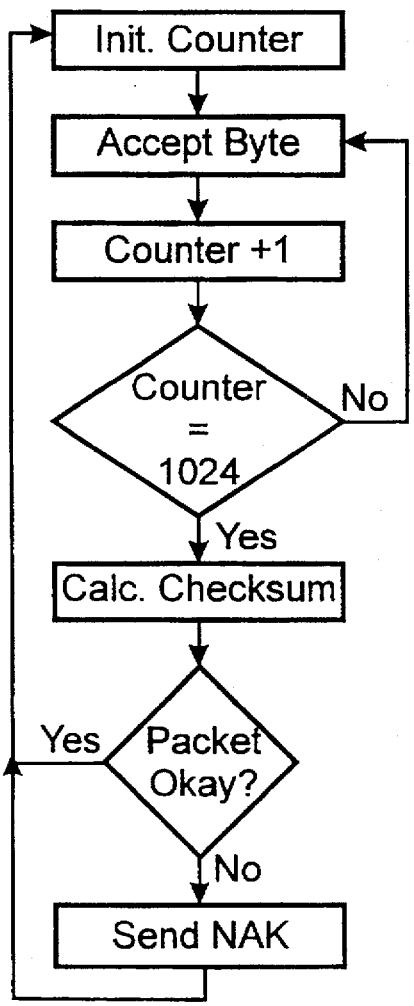 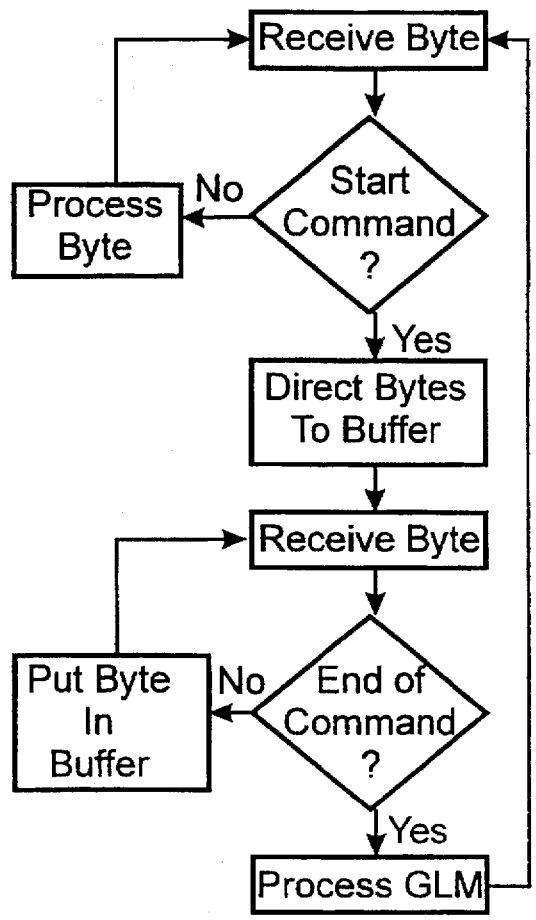
(Prior Art)
Fig. 3a                    Fig. 3b

PROGRAM SYNCHRONIZATION ON FIRST AND SECOND COMPUTERS BY DETERMINING WHETHER INFORMATION TRANSMITTED BY FIRST COMPUTER IS AN ACCEPTABLE OR UNACCEPTABLE INPUT TO SECOND COMPUTER PROGRAM

FIELD OF THE INVENTION

The invention relates generally to systems for communication between computers and more particularly to a method and an apparatus for high speed interactive or multiactive communications between computers which are connected by dial-up phone lines.

BACKGROUND OF THE INVENTION

Personal computers (PC's) are becoming increasingly popular and their use is becoming widespread. Because of the increased popularity of PC's and the use of multiple platforms, systems for communication between individual PC's are growing increasingly important. Although dedicated lines for communication between PC's or between PC's and other computers are the most reliable means for communication, the installation of sufficient lines to meet the demand in the current market makes this means impractical. It is therefore useful to develop more efficient and reliable systems for using standard telephone lines or other limited-bandwidth means to transfer data for computer communications.

Although this specification uses language relating to telephone lines, the invention relates equally to other transmission means which are more limited in bandwidth, hence slower, than networks, which can transfer data at a speed of at least one million bits per second (bps). The invention thus contemplates operation even in direct PC-to-PC environments, in which data is transferred in excess of 100,000 bps.

The use of telephone lines for computer communications is already well known, and the use of modems to transfer computer data across phone lines is commonplace. Modems and telephone lines are currently used to transfer data from PC to PC, between PC's and electronic bulletin boards (BBS) or dial-up services (e.g., Compuserve, America Online), and between PC's and servers which provide access to the Internet (sometimes called the information superhighway). There are, however, no existing means for multiactively operating an application (a computer program) resident on a computer through communications from another computer using modem communications or similar means, including digital signal processors. ("Multiactive" is used herein to refer to the ability of the invention to carry on communications regarding more than one task and/or user at a time, and is somewhat analogous to both multitasked communications and interactive communications, as will be explained in more detail below.) Similarly, there are no means in the prior art to accomplish remote, "on the fly" programming and control of one computer from another computer. "On the fly" programming refers to constructing or altering the programming of an application while that same application is executing. By altering the programming of an executing application, a new application is created which exists in the virtual space which is herein defined as the shared memory and resources of both the terminal and host, rather than in the hard storage of the terminal, from which prior art applications are transferred into memory.

The current standard for communications over telephone lines is commonly referred to as "ANSI", and is defined by the American National Standards Institute. The ANSI scripting language, or protocol, provides for the recognition of the IBM character set and 16 color codes which can be sent from a host computer to a remote computer upon which the received characters and colors will be displayed. The ANSI protocol makes no provision for graphics of any type other than the use of the predefined characters and colors. Further, in order for a remote computer's screen display to be altered, the entire display has to be redrawn by the host, requiring re-transfer of all of the screen information, not just that part which is changed.

Somewhat more advanced, mid-level protocols have been developed, such as RIPscript. "RIP" stands for Remote Imaging Protocol. While not standardized, RIPscript allows the use of very basic graphics which can utilize icons and several types of basic figures which have been previously downloaded to the remote computer. The disadvantages of RIPscript are that the graphics have to be downloaded to the remote computer, taking up space and download time and requiring updates whenever new graphics are to be used. Another major disadvantage is that RIPscript is not standardized and thus its widespread use is almost impossible. RIPscript thus improves upon ANSI to some extent, but it is still very unstable and has limited utility.

ANSI, RIPscript and other prior art terminal communication protocols also have the disadvantage of being susceptible to line noise, which is common on normal phone lines. Because these protocols do not incorporate error checking, there is no assurance of data integrity and data errors can cause interruption, lock-up and termination of communications and/or programs. It is also common for data errors to cause the remote and host computers to lose track of each other's status or place in corresponding programs so that one computer's responses are not matched with the other computer's queries, thus resulting in the complete uselessness of subsequent data which is error-free. This factor alone significantly limits the potential commercial use of prior art systems.

Error checking on data transfers in low bandwidth systems has previously been implemented, but these implementations have several drawbacks. Error checking in this art is usually implemented in hardware. If the error checking on each end of a transfer is not identical however, no checking at all will be accomplished. For example, if the host computer hardware uses V.42bis checking and the remote computer uses MNP5 checking, then the two computers' hardware is incompatible in this respect and no error checking will be accomplished. Although error checking may be implemented in software as well, the protocol must again be the same on both ends of the transfer or it will not work, and typically host software and remote software are written by different companies which do not follow any set standard and thus are usually incompatible.

Prior art error checking also suffers from the drawback that file transfer protocols (which are more likely to use compatible error checking methods) use error checking following each packet of information which is sent from the host to the remote computer, but the error checking is performed on discrete packets of information having a constant length, and the software does not allow for user interaction until completion of the file transfer. It is common for a terminal user to initiate a file transfer and abandon the terminal until the transfer is complete, because the terminal is useless for other purposes until the transfer ends. These error checking methods, as well as the non-multiactive information transfers (which must be terminated to enable unrelated information to be communicated), therefore have no utility in software which is multiactive between the host and remote computers and preclude the emulation of multitasking or timesharing applications.

OBJECTS OF THE INVENTION

Because of the inability of prior art systems to emulate resident applications through programs which are resident on other computers, it is an object of the invention to provide a communications system which allows one computer having resident applications to program another computer to operate as if a non-resident program is executing on that computer.

Because of the popularity of graphical user interfaces (GUI's) and operating systems which use GUI's, such as Windows (Windows is a registered trademark of Microsoft Corp.) it is an object of the invention to provide a communications system which utilizes the remote computer's GUI to carry out functions which in the prior art are performed by the terminal package or other software packages external to the GUI. (For the purposes of the description of the invention below, the term GUI will be used to refer to both graphical interfaces and operating systems which use these interfaces.)

It is another object of the invention to provide a host/terminal communication system which reduces the amount of terminal resources (such as hard disk space, memory, etc.) required to utilize the system by enabling the transmission of programming codes between computers and the reprogramming of applications while they are executing, thereby allowing the functionality of the terminal to be dynamically changed by the host.

It is another object of the invention to provide a host/terminal communication system which utilizes the API's or device drivers of the GUI resident on the terminal.

It is another object of the invention to provide a host/terminal communication system which automatically utilizes the current setup of the GUI on the terminal to display the output of an application.

It is another object of the invention to provide a host/terminal communication system which performs error checking on all information transferred between the host and terminal, independent of hardware, and detects substantially all of the data errors in this information.

It is another object of the invention to provide a host/terminal communication system which maintains synchronization between applications executing on the host and terminal.

It is another object of the invention to provide a host/terminal communication system which does not require external applications at the terminal to process information (e.g., display images) transmitted from the host.

SUMMARY OF THE INVENTION

The invention achieves the above objectives in a host-terminal computer system by executing a host-resident GUI application on the terminal via the terminal's own GUI. The application is implemented using multiactive, cyclic data checking on each transmission of data between the host and terminal computers to ensure the integrity and the validity of each transmission. The invention thereby allows a remote user to transmit data to and from a host computer during an ongoing information transfer and interpret that data so that it can be processed independently of other ongoing processes. The invention also prevents the problems which normally arise from degradation of data between the host and terminal and loss of synchronization between the host and terminal.

The invention allows the terminal software package to be reprogrammed as necessary during a terminal session so that an application is constructed in the virtual space of the terminal's memory without having to be downloaded beforehand. The terminal package can thus be adapted (by reprogramming) to include only those features specifically required by the demands of the terminal session. The reprogrammed application therefore takes up less space in RAM than a previously downloaded application (which must anticipate the user's requirements), and requires no space in a permanent storage device.

The invention also utilizes the terminal's existing GUI settings and preferences so that a single application executed by the host automatically adjusts, by implementation through the terminal's GUI, to appear as though it is being executed as a stand-alone, GUI-based application on the terminal itself. This "transparent" implementation of the host application on the terminal carries with it advantages which include improved speed and user familiarity.

BRIEF DESCRIPTION OF DRAWINGS

FIG. 3a is a flow diagram of a prior art error checking method.

FIG. 3b is a flow diagram of the error checking method of the invention.

DETAILED DESCRIPTION OF THE PREFERRED EMBODIMENT

The present invention provides a method and system for error-checked, synchronized, multiactive operation of host-based applications through terminal-resident GUI's. The invention is implemented in a system which generally comprises three parts: a host computer; a transmission medium; and a terminal computer. Although the terms "host" and "terminal" are used herein, it is not necessary for the purposes of the invention that the computers be different in any way or perform different functions. Both the host and terminal are configured and programmed to operate in accordance with the methods of the invention. The transmission medium may be a phone line or any other means for data transmission which is known in the art. The transmission medium completes what is sometimes termed a "virtual circuit" between the host and terminal.

Figure 1:
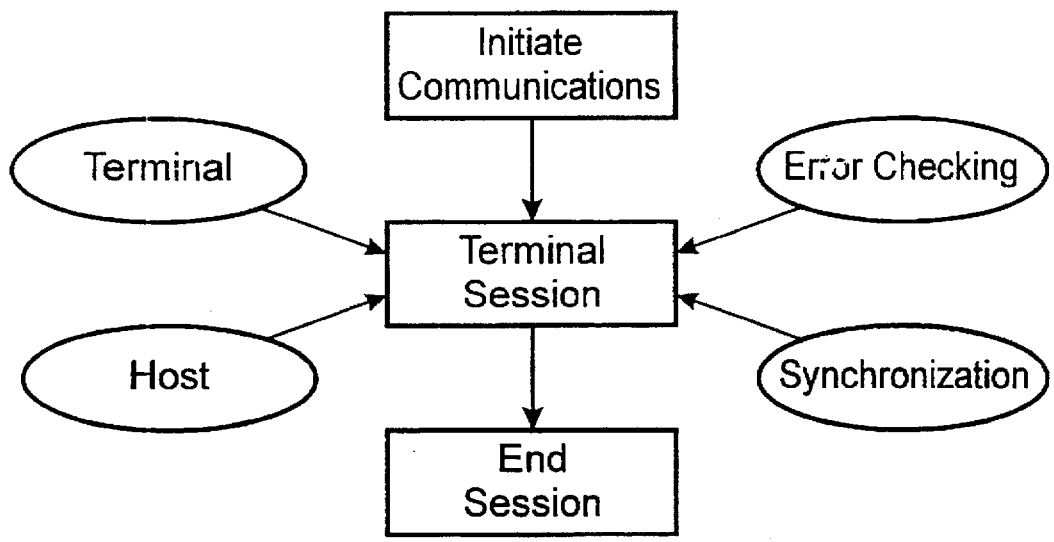
FIG. 1 is a top-level flow diagram showing the interaction of the terminal and host computers and the background operation of error checking and synchronization functions during a terminal session.

FIG. 1 generally depicts the operation of the inventive system, as one computer (the terminal) initiates communications with a second computer (the host), conducts a terminal session, and then ends communications. During the terminal session, error checking and synchronization are carried out on all exchanges of information (through graphical language macros) between the two computers.

In the preferred embodiment of the invention, the terminal is first connected via the transmission medium to the host. Typically, the terminal utilizes an ordinary modem to call and establish contact with the host via standard phone lines. Once a connection has been established, the host transmits a code to the terminal and waits for a response. This code queries the terminal for a response which indicates that the terminal is programmed to communicate with the host in accordance with the inventive methods. If the host does not receive the proper response from the terminal, the connection is terminated.

The terminal, upon receipt of the initial code, transmits a response to the host, indicating that the terminal is properly programmed. When the host receives this response, the configuration of the terminal is confirmed and all further communications between the terminal and host will utilize both error checking and data confirmation to maintain the integrity (error-free condition) of the data and synchronization between the terminal and host. A terminal session then begins. This terminal session will proceed at the direction of the terminal operator and individual sessions will vary accordingly.

Although terminal sessions will vary greatly, there are several features of the invention which are operative throughout each session and which are distinctive of the prior art. Very generally, these include highly effective, hardware independent error detection and correction, synchronization of host and terminal operations, and host manipulation of the Advanced Programmers Interfaces ("API's") of the terminal GUI to bypass unnecessary processing of data before it is displayed at the terminal. These features will be discussed in turn below.

Once the terminal responds to the query of the host and confirms that it is properly programmed, all further communications between the host and terminal incorporate what is termed for the purposes of this description "cyclic data checking" or "CDC". CDC uses 16-bit CRC error checking to test the integrity of data transferred between the host computer and the terminal computer. The 16-bit CRC error checking method is well known in the art and has been found to be 99.999% effective in detecting errors in the transmission of data. Although 16-bit CRC error checking is currently used in the art to insure the integrity of file transfers, this type of error checking has not been implemented in multiactive situations or in the transmission of variable-length information packets.

The invention allows the terminal and host computers to be "multiactive." This term is used to describe the ability of the invention to carry on several activities at the same time, much the same as an operating system on an individual computer may allow the multitasking or timesharing of several different applications. In prior art systems, communications between terminal and remote computers are limited by the fact that one activity (e.g., a file transfer) must be completed before another can be initiated. This limitation derives from the fact that substantially all of the information transfer necessary for an activity must be accomplished at one time. In the invention, packets of information for more than one activity can be interspersed instead of having to be transferred in a single string of information packets relevant to a single activity.

Figure 2:
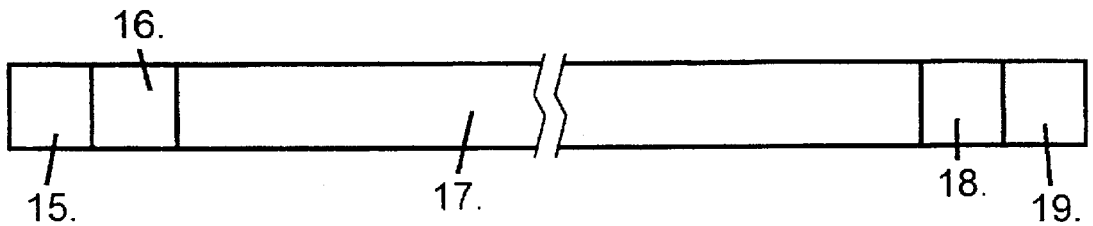
FIG. 2 is a block diagram showing the structure of the graphical language macros of the invention.

In the preferred embodiment of the invention, information which is transferred between the host and terminal is formatted into information packets called, for the purposes of this application, "graphical language macros" ("GLM's"). Each GLM, as shown in FIG. 2, contains three start bytes (15), command data (16), the information to be transmitted (17), error-checking data (18) and a three-byte end code (19). The information to be transmitted may be raw data, such as in a file transfer, a command to be executed by the receiving computer, or any other type of information. The length of this information data is variable, and it is not necessary to add meaningless bytes to the GLM to conform its total length to a fixed value, as is required for prior art error-checking methods.

The beginning and end codes in the preferred embodiment are three-byte codes which simply signal the beginning and end of the GLM's transmission to either the terminal or host. In other words, when one of the computers receives a start code, it knows that the subsequent data will be part of a new GLM—when the end code is received, the computer knows that the entire GLM has been transmitted and can be processed further. This is shown graphically in FIG. 3b. Although the preferred embodiment uses a three-byte code, any suitable code can be used to signal the beginning or end of a GLM.

When the receiving computer has received the entire GLM, it parses the GLM into its components: the command data, the variable-length information data, and the error-checking data. The receiving computer then performs CDC (cyclic data checking). In CDC, the receiving computer uses standard 16-bit CRC error checking to determine whether the error calculation on the information data matches the error-checking data component of the GLM. Any effective error checking method which is known in the art can be used to perform CDC, but 16-bit CRC checking is used in the preferred embodiment because it is effective without requiring excessive processing time. The receiving computer then sends to the transmitting computer either an acknowledgement or a non-acknowledgement that the GLM was received intact. If the GLM is received intact, an acknowledgement signal is transmitted to the computer which transmitted the GLM and the GLM is processed by the receiving computer. If the GLM contains errors, the receiving computer sends a signal to the computer which transmitted the GLM indicating that the GLM contained errors and then the receiving computer discards the GLM. The sending computer, upon receipt of the non-acknowledgement, then resends the GLM.

If the GLM is error-free, the receiving computer processes the GLM's information data according to the GLM's command data. Because the invention provides command data to direct the manner in which the receiving computer processes the information data, a piece of information which is too large to be transmitted in a single information packet need not be received by the receiving computer in consecutive information packets. This allows the transmitting and receiving computers to exchange GLM's representing file transfers, program commands, user input and other information which are interspersed with each other. The invention thereby provides means for multiactive transfers of information, both in terms of transmitting information to and from one computer and in terms of transmitting program commands or other information during a multiple-packet information transfer without having to terminate the multiple-packet transfer.

Using prior art methods, the transfer of a file which fills 1000 information packets, or blocks, is accomplished by transferring the blocks consecutively, without interruption, until the transfer is complete. During the transfer, no commands or other information can be transmitted, either to or from the transmitting computer. The only way to transmit such information prior to completion of the file transfer is to terminate the incomplete transfer. Prior art error checking on information/file transfers is also limited by the fact that these methods are constrained to the transfer of information packets having a set length. This limitation is shown graphically in FIG. 3a. FIG. 3a shows that the error checking method used in Z-modem file transfers must be performed on set-length blocks (e.g., 1024 bytes) because the error checking byte is defined only by its position as the 1024th byte in the information packet. A five-byte piece of information therefore requires the transmission of an additional 1019 bytes which are meaningless and which do nothing but fill the remaining space.

In the present invention, however, packets of information can be transmitted between blocks of the file transfer and interspersed with the blocks of the file transfer. The sequence of the interspersed information packets can be based on assigned priorities, timesharing principles, etc. Because each GLM contains command data to direct processing of the GLM information data, the receiving computer is directed to process these intermediate GLM's appropriately, whether the information data of the GLM is raw data, a command, or other information. When the receiving computer receives a GLM which is a continuation of a file transfer, it is directed to continue the file transfer and add the GLM's information data to the already-opened file. Prior art methods can not distinguish information packets in this manner and would simply place interspersed non-file-transfer information packets in the middle of the transferred file, thus corrupting all of the transferred information.

The invention also provides for the synchronization of the program executing on the terminal computer with the program executing on the host computer. In the preferred embodiment of the invention, synchronization of the terminal with the host is achieved by confirming the integrity and validity of each command or other transmission of information transmitted between the terminal and host.

The integrity of the information is ensured by the CDC which is performed on each GLM. If the GLM contains an error, a non-acknowledgement signal is returned to the computer which transmitted the GLM. If the GLM is error-free, the validity of the information in the GLM is determined by the receiving computer. If the information is an acceptable input to the program executing on the receiving computer, an acknowledgement is transmitted to the computer which transmitted the GLM and the information is processed. If the information is not an acceptable input to the program executing on the receiving computer, a signal indicating non-acknowledgement of the information is transmitted to the computer which transmitted the GLM.

In this manner, the computer which transmits the information does not simply move on to the next program step regardless of whether or not the receiving computer moves on as well—it waits for confirmation that the information received was intact and acceptable, and that the receiving computer is ready to move on to the next step before the transmitting computer moves to the next step itself.

Figure 4:
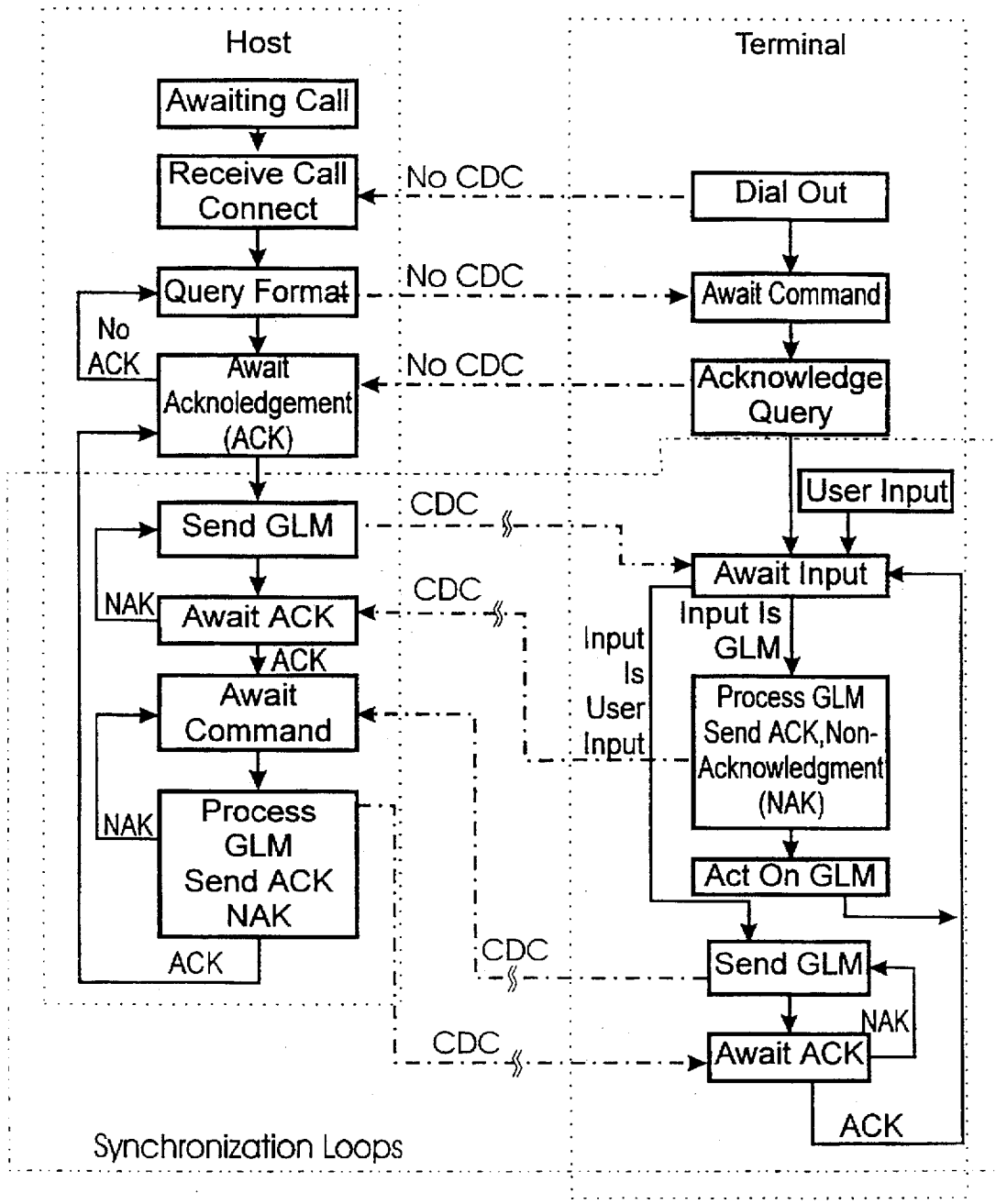
FIG. 4 is a flow diagram of the synchronization method of the invention.

FIG. 4 shows the manner in which the invention checks the GLM's and maintains synchronization. The GLM-processing step includes both the error-checking and the validity checking of the GLM. If the invention is implemented in a system in which the transmission medium between the computers is essentially error-free (e.g., a network environment), the error-checking may be eliminated so that only the validity checking is performed in the processing step.

In prior art systems, on the other hand, both the host computer and terminal computer simply issue commands or transmit data without regard to the receipt of this information by the other part of the system. Thus, when there is a data error in the information transmitted between a prior art terminal and host, the transmitting computer assumes that the information was received by the receiving computer and proceeds to move on to the next step. The receiving computer, however, upon receipt of the invalid information, cannot and does not act on the information. The terminal and host in prior art systems thereby lose synchronization, each assuming that the other either has or has not taken a particular step so that subsequent pieces of information transmitted between the two are inappropriate commands or responses. These synchronization errors are almost always fatal to the terminal session and cause it to be prematurely ended.

Another feature of the invention is its ability to accomplish emulation of an application program running under the terminal GUI. This is accomplished by transferring from the host computer to the terminal computer executable commands as well as simple alphanumeric data. In the preferred embodiment of the invention, the terminal software package and host software package utilize high-level programming languages to generate the API calls that initiate the API's of the terminal computer's GUI. Thus, the host computer can transmit program routines to the terminal computer which open windows to display data, format text around images, accept and process data, and perform other programming-related functions. The invention thereby also provides means for the terminal user to manipulate the information displayed on his screen. For example, the terminal user can resize images, overlap windows, uncover windows, and even manipulate displayed data (e.g., if several numbers and a sum of those numbers is displayed, the sum can be automatically updated when one of the numbers is changed). The invention also allows the components of a displayed image to be associated with one another so that, for example, a user can click on (select using the computer's mouse) an image and thereby cause associated text to be selected, changed, or otherwise manipulated. The user's manipulation of the displayed data is implemented via commands which are transmitted between the terminal computer and host computer, and which are executed by the receiving computer.

By utilizing the terminal computer's GUI in this manner, the invention provides substantial increases in speed over the prior art because the invention requires the transfer of only enough information to change the parts of the terminal computer's display which need to be updated. The invention thus changes only parts of the displayed image rather than the whole screen, or may simply uncover a window rather than having to re-generate an image which had been erased. These features of the invention are typically utilized in conjunction with the ability to reprogram the terminal to execute a minimal amount of program code. The speed of the invention is also improved over the prior art because the invention can transmit executable commands, which may only be several bytes long, instead of lengthy streams of raw data which redraw the display.

Because the invention contemplates the transmission of commands and programming code between the terminal computer and host computer instead of mere data to redraw the screen, the invention enables the host computer to program the terminal computer "on the fly". In other words, the terminal need not be pre-programmed, as are prior art systems, but can instead receive executable commands as needed during a terminal session. The invention thereby avoids the problems of having to download an entire program prior to beginning the terminal session and having to store all the necessary programs at the terminal. With the invention, downloading can be limited to only those codes or commands which call the API's and which would in the prior art have to be generated by a terminal-resident package.

Because the invention allows the terminal program to be revised as it executes during the terminal session, the new application which is thereby created exists only in virtual space. This application does not reside in the terminal's permanent storage, and disappears when the application is terminated. The size of the application may be as large as the virtual space, and typically uses less memory than a comparable downloaded application because the downloaded application includes features which are not typically employed by the terminal user. The application created by the invention is therefore almost infinitely variable and allows the user to build applications which are as varied as are available through the host.

Prior art systems, on the other hand, transmit data to the terminal and then initiate terminal-resident programs, such as image viewers, to display the transmitted information. Most often, these programs are stand-alone programs which a terminal software package must initiate, supply with data, and terminate when no longer needed. It is these stand-alone programs which generate the API calls to produce screen displays. The invention's elimination of the need for these programs saves the time required to transmit the information to these programs and the time required for these programs to generate API calls. Although these stand-alone programs may be incorporated into the terminal software package itself, they still require additional time to access and process information and generate API calls. The invention bypasses such programs and initiates the API's which then display the information in accordance with the configuration of the GUI. The invention thereby eliminates the need for programs external to the basic terminal software, increases the speed with which the information is displayed, eliminates the need to download programs or updates thereto and eliminates the need to transmit extra information which is required by the external programs.

What is claimed is:

1. A method for maintaining the synchronization of a first program executing on a first computer with a second program executing on a second computer which is connected by a transmission medium to the first computer, said method comprising the steps of:

(a) transmitting selected information in one or more packets from said first computer through said transmission medium to said second computer so that said packets are received by said second computer in an error-free condition and extracting said information from said packets, said first computer being further programmed to remain at the programming step of said first program at which said information was transmitted to said second computer;

(b) determining whether said information is an acceptable input or an unacceptable input to said second program executing on said second computer;

(c) if said information is determined to be an acceptable input to said second program, transmitting from said second computer to said first computer an acknowledgement that said information is an acceptable input, said second program then accepting said information, processing said information and advancing to the next program step in said second program;

(d) if said information is determined to be an unacceptable input to said second program, transmitting from said second computer to said first computer a signal that said information is an unacceptable input, said second program remaining at the current program step in said second program;

(e) said first program advancing to the next program step of said first program upon receipt of said acknowledgement;

(f) said first program remaining at the current program step of said first program upon receipt of said signal that said information is an unacceptable input.

2. The method of claim 1 wherein said program executing on said second computer has a defined set of acceptable inputs, said set of inputs being defined independent of said information packet and wherein said unacceptable inputs are not within the defined set of acceptable inputs.

3. The method of claim 2 wherein said transmission medium degrades said information packet during the step of transmitting said information packet from said first computer to said second computers and wherein said step of transmitting said information packet in an error-free condition comprises transmitting said information packet and thereafter performing error checking on said information packet and resending said packet if it contains any errors.

4. The method of claim 2 wherein said transmission medium comprises a modem connected to said first computer, a modem connected to said second computer, and a medium for transmission of the output of one of said modems to the other of said modems.

5. The method of claim 4 wherein said medium for transmission of said modem output is a telephone line.

6. The method of claim 5 wherein said first computer comprises a personal computer and said second computer comprises a dial-up host.

7. The method of claim 5 wherein said second computer comprises a personal computer and said first computer comprises a dial-up host.

8. The method of claim 2 wherein steps (a)–(f) are repeated for transmission of information packets from said second computer to said first computer.

9. The method of claim 2 wherein said transmission medium has a maximum data transmission rate of 500,000 bps.

10. A computer system having more than one computer which maintains synchronization of a first program executing on a first computer with a second program executing on a second computer, said computer system comprising:

(a) a first computer connected to a second computer through a transmission medium;

(b) said first computer being programmed to transmit information in an error-free condition to a second computer, said first computer being further programmed to remain at the programming step of said first program at which said information was transmitted to said second computer until said first computer receives an acknowledgement that said information was received by said second computer and was one of a set of acceptable inputs to said second program executing on said second computer, said set of acceptable inputs being determinable without reference to said information, first computer being further programmed to execute the program step in said first program after receiving said acknowledgement;

(c) said second computer being programmed to receive said information and to determine whether said information is one of said acceptable inputs to said second program running on said second computer, said second computer further being programmed to send said acknowledgment to said first computer if said information is an acceptable input to said second program executing on said second computer, said second program then accepting said information, processing said information and advancing to the next program step in said second program, and to send a non-acknowledgement to said first computer if said information is not one of said acceptable inputs to said program executing on said second computer, said second program remaining at the current program step in said second program.

11. The computer system of claim 9 wherein said first computer is connected to said transmission medium through a first modem and said second computer is connected to said transmission medium through a second modem.

12. The computer system of claim 10 wherein:

(a) said second computer is programmed to transmit information in an error-free condition to said first computer, said second computer being further programmed to remain at the programming step of a program executing on said second computer at which said information was transmitted to said first computer until said second computer receives an acknowledgement that said information was received by said first computer and was one of a set of acceptable inputs to a program executing on said first computer, said set of acceptable inputs being determinable without reference to said information, said second computer being further programmed to execute the next program step of said program executing on said second computer after receiving said acknowledgment;

(b) said first computer being programmed to receive said information and to determine whether said information is one of said acceptable inputs to said program executing on said first computer, said first computer further being programmed to send an acknowledgment to said second computer if said information is one of said acceptable inputs to said program executing on said first computer and to send a non-acknowledgement to said second computer if said information is not one of said acceptable inputs to said program executing on said first computer.

13. The computer system of claim 12 wherein said first computer is a personal computer and said second computer is a dial-up host computer.

14. A method for maintaining the synchronization of a first program executing on a first computer with a second program executing on a second computer which is connected by a transmission medium to the first computer, said method comprising the steps of:

(a) selecting information to be transmitted and formatting said information into one or more data packets;

(b) transmitting said packets from said first computer through said transmission medium to said second computer so that said packets are received by said second computer in an error-free condition, said first computer being further programmed to remain at the programming step of said first program at which said information was transmitted to said second computer;

(c) reformatting said packets into said selected information;

(d) determining whether said selected information is one of a set of acceptable inputs to said second program executing on said second computer, (e) if said selected information is determined to be an acceptable input to said second program transmitting from said second computer to said first computer an acknowledgement that said selected information is an acceptable input said second program then accepting said selected information, acting on said selected information and advancing to the next program step in said second program;

(f) if said selected information is determined not to be one of said acceptable inputs to said second program transmitting from said second computer to said first computer a signal that said selected information is an unacceptable input, second program remaining at the current program step in said second program;

(g) said first program advancing to the next program step of said first program upon receipt of said acknowledgement:

(h) said first program remaining at the current program step of said first program upon receipt of said signal that said information packet is an unacceptable input.

* * * * *